UNITED STATES PATENT OFFICE.

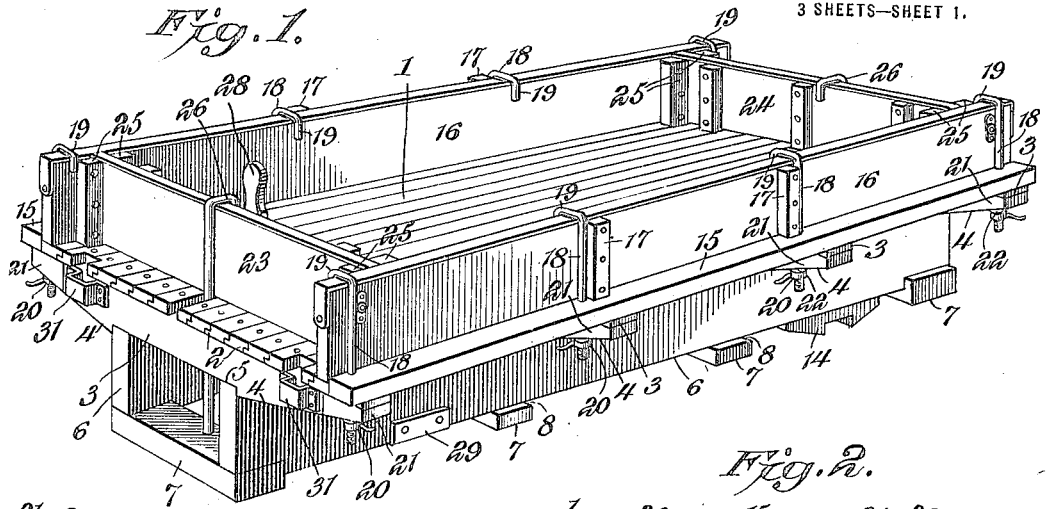

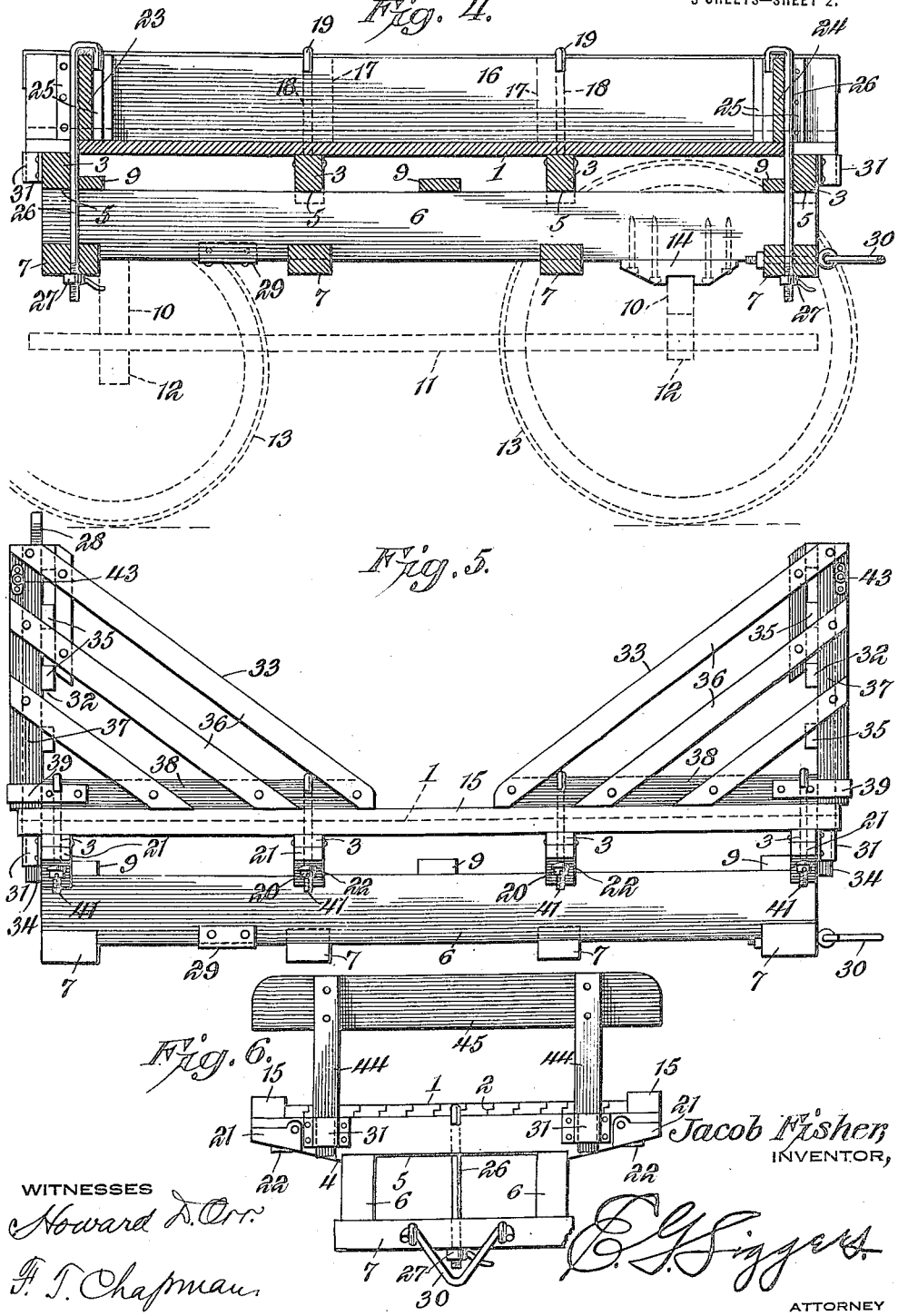

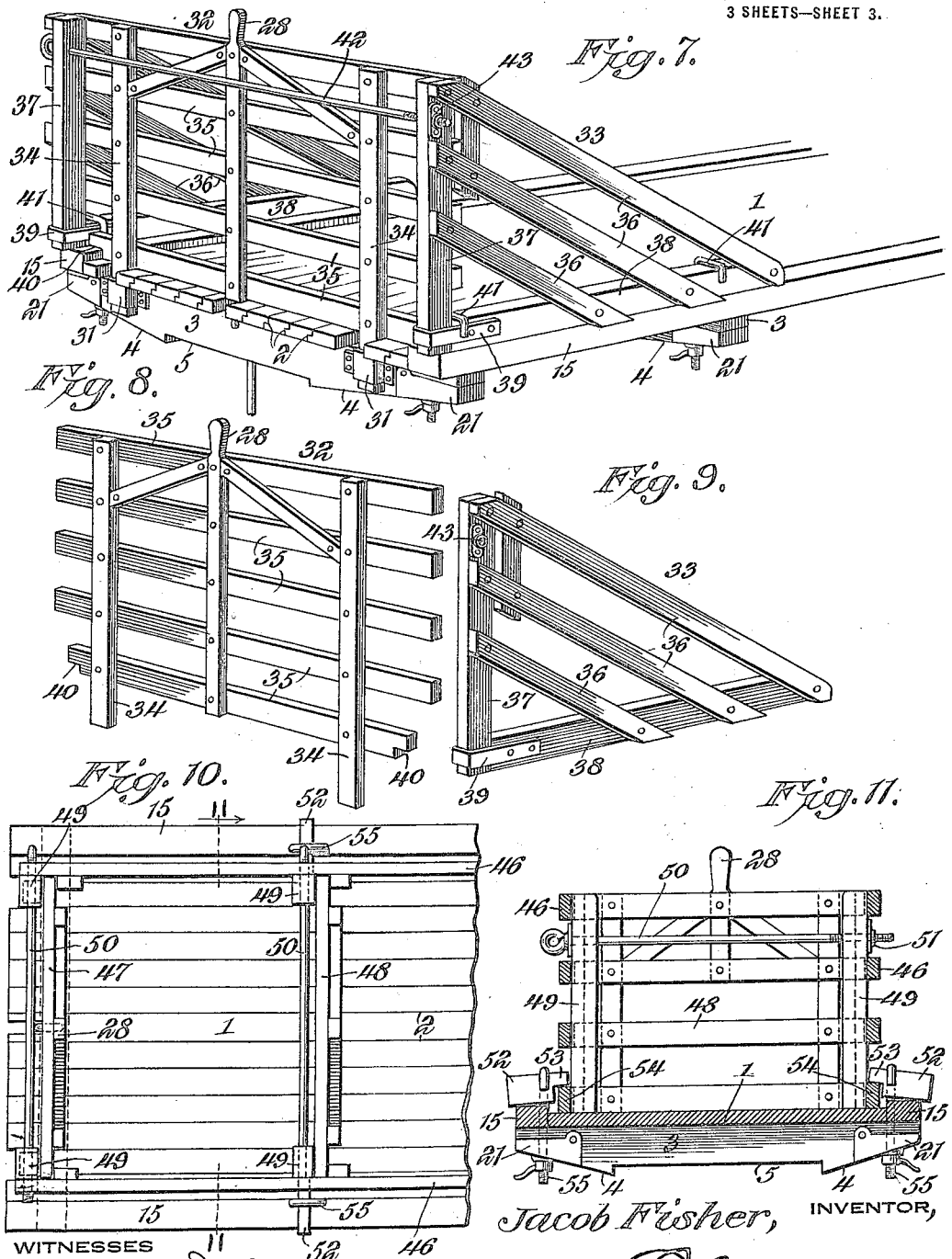

JACOB FISHER, OF WABASH, INDIANA.

RACK STRUCTURE FOR VEHICLES.

1,403,307.  Specification of Letters Patent.  Patented Jan. 10, 1922.

Application filed June 21, 1919. Serial No. 305,730.

*To all whom it may concern:*

Be it known that I, JACOB FISHER, a citizen of the United States, residing at Wabash, in the county of Wabash and State of Indiana, have invented a new and useful Rack Structure for Vehicles, of which the following is a specification.

The invention has reference to rack structures for vehicles, whereby the same structure in whole or in part may be used as a hay rack, a grain rack, or a stock rack, and may be applied to or removed from the vehicle body and adapted for various purposes with an exertion of strength within the power of one man.

In accordance with the invention the structure, which, for convenience of description, may be termed a hay rack, although by no means confined to such particular use, comprises a body applicable to or removable from the running gear of a vehicle, the body having removable sides and end gates and provided with a tight floor so that with the assembly of side and end gates on the floor the structure provides a particularly efficacious grain rack or box. With such an arrangement grain may be carried from place to place in the sheaf, or threshed grain may be carried from place to place, without loss, such loss in the usual manner of transporting grain from the field or elsewhere amounting to many thousands of bushels throughout the country during the grain season and at other times.

In order to extend the usefulness of the grain rack or box, certain parts are made removable and replaceable by a minimum number of other parts, whereby some parts of the grain rack are utilizable for other purposes when suitably supplemented. The arrangement is such that by the removal of certain parts of the grain rack other parts may be substituted and the grain rack or box becomes converted into a bundle rack, or a hay rack, or a fodder rack, as the case may be. By the substitution of other parts the grain box, or hay or fodder rack may be readily changed into a stock rack. By such arrangements the various parts are supplemented to each other and the invention is of extended use on a farm where grain, hay, fodder, live stock and the like are raised.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of a body structure constituting the body portion and sub-structure of a grain box for application to the running gear of a vehicle.

Figure 2 is a bottom plan view of the structure shown in Figure 1.

Figure 3 is an upright cross section about midway of the length of the grain box.

Figure 4 is a longitudinal vertical section of the grain box showing the application thereof to the running gear of a vehicle, the wheels and other parts of which are indicated in dotted lines.

Figure 5 is a side elevation of the structure as arranged to constitute a bundle rack.

Figure 6 is an end view of one extremity of the structure shown in Figure 5, with the side racks at one end omitted and an end device substituted to provide a hay rack.

Figure 7 is a perspective view of one end of the structure as arranged as a bundle, hay or fodder rack.

Figure 8 is a perspective view of the forward end gate of the rack as shown in Figures 5 and 7.

Figure 9 is a perspective view of one of the longitudinally arranged racks forming a part of one side of the structures in Figures 5 and 7.

Figure 10 is a top plan view of the structure as arranged for a stock rack.

Figure 11 is a section on the line 11—11 of Figure 10.

In accordance with the invention, there is provided a platform 1 constituting a floor and in order to make the floor tight irrespective of the effects of weather conditions to which the structure is necessarily subjected, the floor may be made up of numerous longitudinal strips joined edge to edge with stepped or shiplap joints 2, although such particular form of joints is not obligatory. The flooring of the platform is supported by cross bars 3 near the ends and at intermediate points, the flooring being nailed or otherwise secured to the cross beams, which latter are beveled near the ends, as shown at 4, so as to approach the ends at a rising angle, although this feature is not obligatory. The bottom edge of each cross bar 3 on opposite sides of the mid-point thereof is notched or recessed, as shown at 5, to receive the upper edges of sills 6 set on edge and extending lengthwise of the structure. The sills engage sidewise against the ends of the recesses 5 and are held in such spaced relation by blocks or spreaders 7, each having the end portions of one edge notched or recessed, as shown at 8, so as to inset to an extent between the sills. The spreaders 7 are located beneath the sills and may conform in spacing to the cross pieces 3. Moreover, other cross pieces 9 extend between the top edges of the sills and so aid in spacing and bracing the latter. Two of the cross pieces or bars 9 may be arranged close to the bars 3 thereby contributing to preventing longitudinal movements of the floor 1 on the sills. The floor 1 has a broader support at the rear than at the forward end by arranging the sills 6 in divergent relation from front to rear. The several parts which have been so far described and which are designed to remain in permanent relation to each other may be nailed, screwed, or bolted together.

In order to carry the sills and parts erected thereon bolsters 10 are made fast to the sills in any appropriate manner and these bolsters are connected by a reach 11 and have axles 12 and wheels 13 secured to them after ordinary wagon body construction, for which reason the under structure or running gear of the vehicle body is indicated in dotted lines in Figure 4, and the rear bolster receptacle 14 is indicated in full lines in Figures 1 and 4.

Along each side of the floor 1 and resting on the ends of the cross pieces 3 are longitudinal strips 15 somewhat thicker than the floor to form side bearings for the lower edges of side members 16 of a body structure constituting a grain box. The side members have exterior cleats 17 for strengthening purposes and clip bolts 18 extend alongside the cleats and are arranged to engage with their ends 19 over the upper edge of the respective side 16. The bolts 18 extend downwardly through the strips 15 and then through the respective cross bar 3, the bolt receiving a nut 20, which may be a handle nut, at the lower end, whereby the side 16 may be tightly clamped down upon the floor 1 in longitudinal side abutment with the strip 15. Because of the beveled edges 4 of the bars 3, such bevel portions are provided with socket plates 21 each with a struck-up boss 22 where traversed by a bolt 18 so that the nut 20 has a square bearing thereon.

The grain box body is provided with head and tail gates 23, 24 respectively, similar to the sides 16 and fitted between adjacent cleats 25 on the inner faces of the sideboards 16. Elongated bolts 26 similar to the bolts 18 extend through the mid-portions of the end bars 3 and through the cross bars 7 and 9 where these bolts receive handle or wing nuts 27 like the wing nuts 20. The bolts 18 and 26 serve to connect the sideboards and end gates of the grain box firmly upon the floor 1 but permit the ready removal of these parts whereby, when desired, other structures may be substituted for the grain box with the floor 1 and parts carrying it and connected to it retained.

It is quite customary in farm wagons of various kinds to provide a rein post for the lines and the head-board 23 is shown in Figure 1 provided with a rein post 28. For protective purposes the forward portions of the sills 6 are provided with wear plates 29 against which the steering wheels may engage when the vehicle is in use and turning. At one end of the body there is provided a pivoted link 30 by means of which the body may be drawn along by suitable power or may be utilized to draw a load following it. At opposite ends of the vehicle body, preferably fast to the end cross bars 3, are stanchion sockets or eyes 31 to hold parts which may be substituted for the end gates 23 and 24.

When it is desired to convert the grain box into a bundle rack the side-boards 16 and end gates 23 and 24 are removed and in their places are substituted end gates 32, such as shown separately in Figure 8, and side frames 33, such as shown separately in Figure 9, there being shown a side view of the bundle rack in Figure 5 made up of two end gates 32 and appropriate side frames 33 associated at opposite ends of the floor 1. Each end gate 32 is made up of uprights or stanchions 34 and cross strips 35, nailed or bolted together, and in the case of the head gate, having a rein holder 28 as described with reference to the head gate 23. The strips 35 are long enough to meet slanting strips 36 connecting angularly arranged bars 37, 38 constituting the side frame 33, a triangular frame. A strip 39 is provided to connect the meeting ends of the bars 37 and 38 so that these bars and the strips 36 are all rigidly connected to form the frame 33. The lower bar of the series of bars 35 is shortened at the ends and notched, as shown at 40, to fit over the strip 15 and a clip bolt 41 serves to hold each frame 33 upon the respective beam or strip 15. When the head or tail gate is in place the respective stanchions 34 engage in the stanchion sockets or holders 31 and to further hold the gate against tipping the uprights or posts 37 are traversed by a bolt 42 which may be provided with a head at one end and is threaded through a screw plate 43 at the other end, the plate being made fast to one of the posts 37.

By providing the head and tail gates and side frames shown in Figures 5, 7, 8 and 9, the platform 1 is converted into a bundle rack capable of receiving and carrying bundles.

When it is desired to utilize the structure as a hay rack, the head gate 32 and side frame 33 may be installed at the forward end of the body while like parts at the other end of the body are replaced by a frame made up of two stanchions 44 spaced to fit the stanchion sockets 31, and the upper ends of the stanchions are connected by a cross board 45, the parts being such as to hold hay without the liability of losing it.

The structure thus readily convertible into a hay, fodder, or bundle rack is also susceptible of use as a stock rack. This is accomplished by substituting long frames 46, (see Figures 10 and 11,) for the sides 16 of the grain box or the side frames 33 of the bundle rack, and by substituting end gates 47 for the end gates 32, but which may be of less height, although of similar construction, and providing intermediate gates or partitions 48 at different points along the body or floor 1 between the frames 46. The frames 47 and 48 may be alike for interchangeability and upright posts 49 of the side frames 46 are traversed by bolts 50 with one end of each bolt having a nut 51 whereby the parts may be drawn into tight relation. Blocks 52 each with an end tongue 53 are placed to clip over the lower longitudinal strips 54, these blocks being held by clip bolts 55 like the clip bolts previously described but differing therefrom only in length to adapt them to the particular purpose designed.

It is to be understood that the invention is not confined in its usefulness to the type of vehicle known as a farm wagon, for it is designed to be attached to various types of vehicles. The attachment is adaptable to automobile trucks and to existing farm wagons, so that, in the case of a farm wagon, it is only necessary to secure some strips on the cross sills so that they resemble the cross bars 3 and then use appropriate clip bolts 18 to hold the demountable body members and racks, and the farm wagon becomes converted into any one of the various arrangements shown in the drawings.

A characteristic feature of this invention is the arrangement and location of the clip bolts 18, 19 which constitute the means for holding in place the side boards 16 of the grain box body, the side frames 33 of the bundle or hay rack, and the side frames 46 of the stock rack. No change in the location of the bolts is necessary for this three-fold purpose, but the clip ends of the bolts must be shifted as indicated. In Figures 1, 3, 4, inclusive, the clips are turned inwardly toward the longitudinal center of the vehicle; in Figures 5 and 7 the clip ends are turned outwardly, while in Figure 11 the clip ends are turned toward the ends of the vehicle because the blocks 52 have to be used.

What is claimed is:—

1. In a vehicle body construction, a platform, cross beams underlying the platform to the side edges thereof and recessed on their under edges, longitudinal sills supporting the cross beams and set in said recesses and held thereby from outward movement, spreaders upon which the sills rest having notches to engage the sills and hold the same from inward movement, a receptacle forming structure adapted to rest upon the platform, and bolts engaged with the spreaders for holding the cross beams, sills and spreaders in assembled relation.

2. In a vehicle body construction, a platform, cross beams underlying the platform to the side edges thereof and recessed on their under edges, longitudinal sills supporting the cross beams and set in said recesses and held thereby from outward movement, spreaders upon which the sills rest having notches to engage the sills and hold the same from inward movement, a receptacle forming structure adapted to rest upon the platform, and bolts engaged with the spreaders for holding the cross beams, sills and spreaders in assembled relation, said bolts being passed up through said platform and engaged with the ends of said structure to assist in holding the same in place.

3. In a vehicle construction, a platform comprising a series of associated strips joined edge to edge in grain-tight relation, said platform having longitudinal strips thicker than the first named strips so as to be raised above the same and constituting long edge members of the platform, cross beams supporting the platform and extending to the side edges thereof, side and end members adapted to the platform with the side members resting upon the cross strips and abutting at their sides the longitudinal thicker strips, clip bolts passed upwardly through the cross beams and through said thicker strips and formed into hooks engaging over the upper edges of the side members to hold them to the platform, and securing means at the lower ends of the clip bolts beneath the cross beams.

4. In vehicle construction, a platform comprising a series of associated strips joined edge to edge in grain-tight relation, said platform having longitudinal strips thicker than the first named strips so as to be raised above the same and constituting long edge members of the platform, cross beams supporting the platform and extending to the side edges thereof, side and end members adapted to the platform with the side members resting upon the cross strips and abutting at their sides the longitudinal thicker strips, said side members having vertical cleats, clip bolts passed upwardly through the cross beams and through said thicker strips on the outside of the side members alongside the cleats and formed into hooks engaging over the upper edges of the side members to hold them to the platform, and securing means at the lower ends of the clip bolts beneath the cross beams.

5. In vehicle construction, a platform having longitudinal strips connected thereto and having a greater height so as to be raised above the platform, said strips constituting long edge members of the platform, cross beams supporting the platform and extending to the side edges thereof, side and end members of either a grain box body, or a hay or bundle rack or a stock rack constructed to be used interchangeably with said platform without any alteration or addition, the side members of the grain box body or the stock rack being adapted to rest upon the platform alongside the raised edges of said longitudinal strips, or the side members of the hay or bundle rack may rest upon said strips, clip bolts passed upwardly through the cross beams and through said longitudinal strips either on the outside of the side members of the grain box body and the stock rack, or on the inside of the side members of the hay or stock rack, the clip ends at the tops of said bolts being turnable either inside or outside or facing either end, and securing means provided on the lower ends of said bolts beneath the cross beams.

In testimony that I claim the foregoing as my own, I have hereto affixed my signature.

JACOB FISHER.

Witnesses:
A. N. M. CROCKER,
EARL UNGER.